Nov. 27, 1928.

W. ERNST

SEMIAUTOMATIC VALVE

Filed July 26, 1926

Inventor
Walter Ernst

By Baldwin & Wight

Attorneys

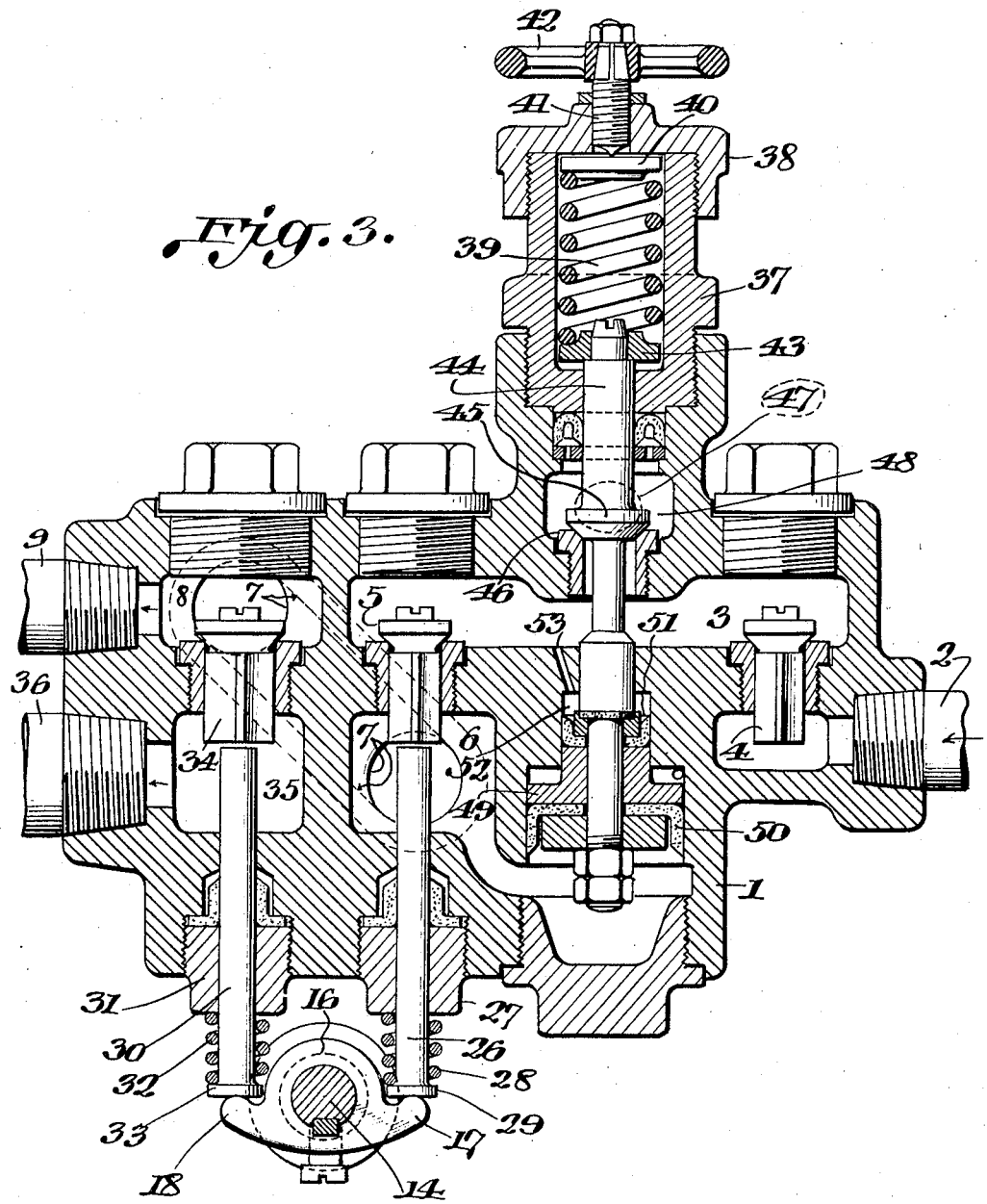

Patented Nov. 27, 1928.

1,693,109

UNITED STATES PATENT OFFICE.

WALTER ERNST, OF MOUNT GILEAD, OHIO, ASSIGNOR TO HYDRAULIC PRESS MANUFACTURING COMPANY, OF MOUNT GILEAD, OHIO.

SEMIAUTOMATIC VALVE.

Application filed July 26, 1926. Serial No. 124,906.

In the operation of presses which employ hydraulic pressure, it is customary to admit fluid under low pressure at the beginning of the pressing operation and after a certain resistance is reached to then admit fluid under high pressure for the completion of the operation. This has commonly been done by means of an operator who is obliged to open and close certain valves in their proper sequence. Not only is it impossible to carry out the operation rapidly, but it is also difficult to know just when the low pressure fluid should be cut off and the high pressure fluid admitted.

The purpose of this invention is to provide a valve mechanism to be interposed between the press and the sources of high and low pressure fluids such that when the operation is initiated by manually operating a valve to admit the fluid under low pressure thereafter, the admission of fluid under high pressure takes place automatically without any further attention on the part of the operator, and whenever the resistance has reached a certain point.

A further object of the invention is to provide in such a mechanism a means for exhausting the fluid under pressure after the operation has been completed, which will prevent any unnecessary loss of fluid under pressure.

Other objects of the invention will be apparent from the following detailed description and by the appended claims.

In the drawings:

Figure 3 is a vertical section through the device.

Figure 1:
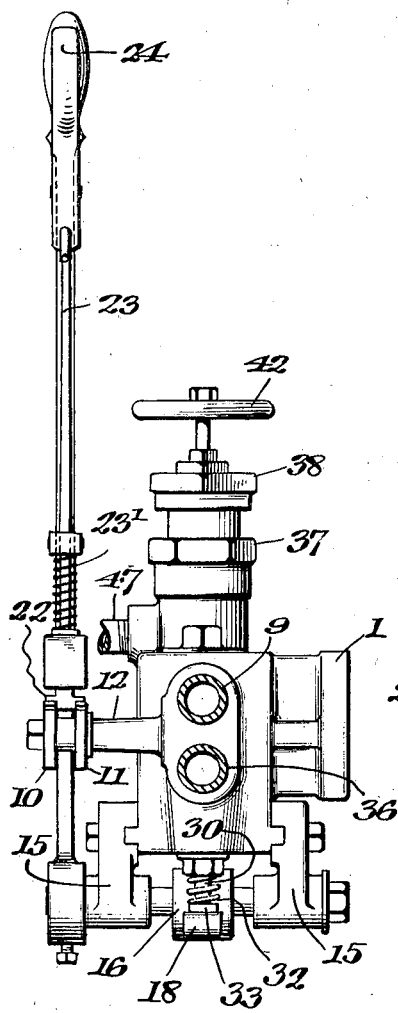
Figure 1 is a side elevation of the device.

The invention embodies a casing 1, to which is connected at one side a pipe 2 for the inlet of fluid under low pressure. This communicates with a small chamber and a check valve 4 controls the passage of fluid from this small chamber to the chamber 3. This check valve is adapted to be raised from its seat by the pressure of the incoming fluid. A similar valve 5 controls the outlet of fluid from the chamber 3 into a chamber 6 from which the fluid passes through a passage 7 into another chamber 8 which communicates by a pipe 9 with the press.

Spaced plates 10 and 11 are supported by arms 12 of the casing and between these plates moves a lever 13, the lower end of which is splined or otherwise rigidly fastened to a rock shaft 14. This rock shaft is mounted in bearings in arms 15 depending from the casing 1. A collar 16 is fast on the central portion of the shaft and has cam extensions 17 and 18, the purpose and operation of which will be hereinafter set forth. The plates 11 and 12 are provided with three notches 19, 20 and 21 and a proper pawl or detent 22 is adapted to engage in either of these pairs of notches. The detent 22 is on the lower end of a link 23 which is fast to a member 24 pivoted at 25 to the upper end of the lever 13. It is obvious that by grasping the lever and handle 24 in the usual manner, the detent 22 may be removed from the notch in which it rests against the tension of a spring 23', after which the lever 13 may be rocked as desired.

Underlying the valve 5 is a stem 26 which is slidably mounted in the bushing 27 secured in the casing 1 and an appropriate packing is provided for this stem. A spring 28 coiled about the stem rests at one end against the bushing 27 and at its other end against an enlargement 29 on the stem. This enlargement directly overlies the cam member 17 previously mentioned.

Overlying the cam member 18 is an enlargement 33 of a similar stem 30 which is mounted in a bushing 31 provided with usual packing and a coil spring 32 surrounds this stem and bears at one end against the bushing 31 and at its other end against the enlargement 33.

The upper end of the stem 30 underlies a valve 34 which controls communication from the chamber 8 to a chamber 35 which communciates by a pipe 36 with the exhaust.

In the upper part of the casing 1 is a cylindrical extension into which is screw threaded a member 37 upon which is fastened a cap 38. A spring 39 is enclosed within the member 38. A spring 39 is enclosed within the member 38 and bears at one end against a washer 40, the position of which may be adjusted by a screw 41 screw threaded into the cap 38 and turned by a handle 42. The other end of the spring 39 bears against a washer 43 supported on the upper end of a valve stem 44 which has intermediate its ends a valve 45 resting upon a valve seat 46. This valve is located in a chamber 48 to which fluid under high pressure is admitted by a pipe 47.

The valve stem extends downwardly and has on its lower end an enlargement 49 held in position by suitable nuts and provided with packing 50. At the upper end of this enlargement is packing 51 and this moves to and fro in a small chamber 52 provided with a small passage 53 communicating with the chamber 3. In this manner a differential pressure is established, the purpose of which will be hereinafter set forth.

Figure 2:
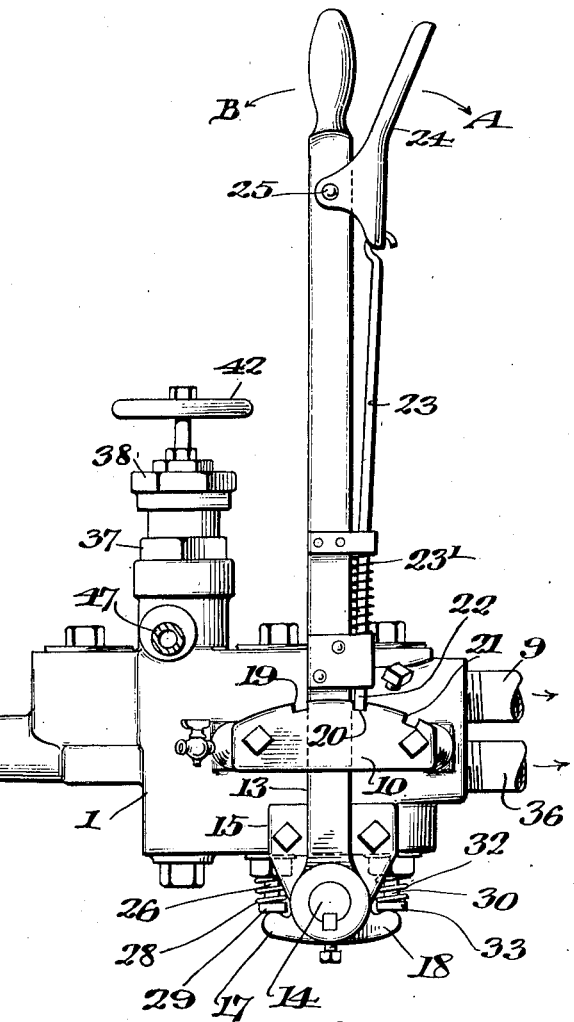
Figure 2 is a side elevation taken at right angles to Figure 1.

Assuming that the lever 13 is in the mid position as shown in Figure 2, the parts will occupy the position shown in Figure 3 and no fluid will pass through the mechanism. If it is desired to initiate the pressing operation, the handle 24 is operated to release the detent 22 and the lever 13 is then moved in the direction of the arrow A until the detent 22 engages the notch 21. This movement will cause the cam member 17 to lift the stem 26 and raise the valve 5 off of its seat. Fluid under low pressure will, therefore, enter through the pipe 2, lifting the valve 4 from its seat and pass through the chamber 3 past the valve 5 into the chamber 6 through the passageway 7, chamber 8, and pipe 9 to the press. As soon as the desired resistance has been reached, which can be adjusted by varying the tension of the spring 39, the pressure in the chamber 6 will build up to such a point that its force exerted against the large piston head 49 will lift the valve stem 44 against the tension of the spring 39 and raise the valve 45 from its seat, allowing fluid under high pressure to enter from the pipe 47 and pass through the chamber 48 past the valve 45 into the chamber 3 and thence to the press as above described for the fluid under low pressure. As soon as the fluid under high pressure enters the chamber 3, it will of course close the valve 4 and prevent the fluid under high pressure from escaping in this direction.

When the pressing operation has been completed, the operator will again grasp the handle 24, releasing the detent 22 from the notch 21 and moving the lever 13 in the direction of the arrow B. As soon as the lever reaches mid position, the valve 5 will drop to its closed position, thus preventing the fluid under high pressure from escaping from the chamber 3 into the chamber 6. A continued movement of the lever 13 will bring the detent 22 to a position in which it will engage the notch 19. This operation will cause the cam 18 to lift the stem 30 and raise the valve 34 off its seat, thereby permitting the fluid from the press to return from the pipe 9 and chamber 8 past the valve 34 into the chamber 35 and out through the pipe 36. Also the fluid under high pressure in the chamber 6 will go through the passageway 7 into the chamber 8 and out to the exhaust in similar fashion. As soon as the exhaust has operated to reduce the pressure in the chamber 6, the spring 39 will operate to close the valve 45 and cut off the fluid under high pressure from the chamber 3.

It is to be noted that the valve 5 closes before the exhaust valve is opened and there can, accordingly, be no unnecessary loss of fluid under high pressure, since when the exhaust valve 34 is opened, the valve 5 has been closed and only the fluid in the chamber 6 and from the press is allowed to escape to the exhaust. This is a marked advantage over prior constructions in which the valve controlling admission of fluid under high pressure is not closed until after the exhaust valve is opened.

Although not particularly stated, it may be noted that each valve is provided with a proper valve seat which may be machined to fit the valve accurately and these valve seats are fitted into the proper openings. Also packings as desired are provided wherever it is necessary to prevent leakage so far as possible.

Minor details of construction and the general arrangement of the elements of the device may be modified quite widely without in any way departing from the fundamental feature of the invention, and it is, therefore, understood that the invention is to be regarded as limited only by the scope of the appended claims.

I claim as my invention:

1. Valve mechanism comprising a casing, a chamber therein, means for admitting a fluid under pressure thereto, means for admitting a fluid under higher pressure to said chamber, which second means is operable automatically by the first-named fluid when the pressure in the chamber reaches a predetermined value, and a third means independently operable for connecting the chamber to the exhaust, the first means being located intermediate the second means and the chamber and operating to cut off from the chamber the flow of both fluids before the second means closes, and the second means closing only after the chamber has been connected to the exhaust.

2. Valve mechanism comprising a casing, a chamber therein, a valve for admitting fluid under pressure thereto, a second valve for admitting fluid under higher pressure to said chamber, which second valve is operable automatically by the first-named fluid when the pressure in the chamber reaches a predetermined value, the first valve being located intermediate the second valve and the chamber, a third valve operable to connect the chamber to the exhaust, and operating means for the first and third valves which allows the first valve to close to cut off from the chamber the flow of both fluids before the second valve closes and before the third valve can be opened, the second valve closing only after the third valve is opened.

3. Valve mechanism comprising a casing enclosing a chamber, means connected to said casing for supplying fluid under pressure, means connected to said casing for supplying fluid under high pressure, two valves within said casing, the first valve being located intermediate the second valve and the chamber and controlling the supply of fluid under pressure thereto, the second valve controlling the supply of fluid under higher pressure thereto, and a third valve independently operable for connecting the chamber to the exhaust, the first valve operating to cut off from the chamber the flow of both fluids before the second valve closes, and the second valve closing only after the chamber has been connected to the exhaust.

4. Valve mechanism comprising a casing enclosing a chamber, means connected to said casing for supplying fluid under pressure, means connected to said casing for supplying fluid under high pressure, two valves within said casing, the first valve being located intermediate the second valve and the chamber and controlling the supply of fluid under pressure thereto, the second valve controlling the supply of fluid under higher pressure thereto and operable automatically by the first-named fluid when the pressure in the chamber reaches a predetermined value, and a third valve independently operable for connecting the chamber to the exhaust, the first valve operating to cut off from the chamber the flow of both fluids before the second valve closes, and the second valve being held open by the pressure in the chamber until after the chamber has been connected to the exhaust.

5. Valve mechanism comprising a casing enclosing two communicating chambers, means connected to the casing for supplying fluid under pressure, means connected to the casing for supplying fluid under higher pressure, manually operable means for controlling the passage of fluid from the first chamber to the second, means for permitting fluid under higher pressure to enter the first chamber and opened by the pressure in the second chamber when it reaches a predetermined point, and a third means for connecting the chamber to the exhaust, the first means closing communication between the two chambers before the third means is operated, and the second means closing only after the third means is operated.

In testimony whereof I have hereunto subscribed my name.

WALTER ERNST.